United States Patent
Ikegame

(10) Patent No.: US 6,721,112 B2
(45) Date of Patent: Apr. 13, 2004

(54) MIRRORS DRIVE DEVICE

(75) Inventor: Tetsuo Ikegame, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 10/021,652

(22) Filed: Dec. 12, 2001

(65) Prior Publication Data
US 2002/0075786 A1 Jun. 20, 2002

(30) Foreign Application Priority Data

Dec. 19, 2000 (JP) .......................... 2000-385619

(51) Int. Cl.$^7$ .......................... G02B 7/02; G02B 26/00; G02B 6/26; G11B 7/00
(52) U.S. Cl. .................. 359/824; 359/813; 359/814; 359/822; 359/290; 359/291; 369/44.14; 369/44.15; 385/16; 385/17; 385/18
(58) Field of Search ................ 359/824, 813, 359/814, 822, 290, 291, 627; 369/44.11, 44.14, 44.15, 44.16, 244, 199; 385/16, 17, 18

(56) References Cited

U.S. PATENT DOCUMENTS 5,886,978 A * 3/1999 Matsui ................. 369/244
6,373,811 B1 * 4/2002 Ikegame et al. ......... 369/199
6,424,759 B1 * 7/2002 Jing ...................... 385/17

FOREIGN PATENT DOCUMENTS

JP 11-211969 A 8/1999

* cited by examiner

Primary Examiner—Loha Ben
Assistant Examiner—Jack Dinh
(74) Attorney, Agent, or Firm—Frishauf, Holtz, Goodman & Chick, P.C.

(57) ABSTRACT

The optical element drive device is provided which includes: (i) a plurality of movable members to which a plurality of optical elements having functions for changing a path of light are attached, respectively; (ii) a plurality of support mechanisms for independently supporting the plurality of movable members in a displacable condition, (iii) a plurality of drive mechanisms for driving the plurality of movable members, and (iv) a fixed member to which the plurality of movable members are mounted. The plurality of drive mechanisms have coils and magnets, and at least one component of the plurality of drive mechanisms is used to drive at least two of the plurality of movable members.

35 Claims, 17 Drawing Sheets

MIRRORS DRIVE DEVICE

This application claims benefit of Japanese Application No. 2000-385619 filed on Dec. 19, 2000, the contents of which are incorporated by this reference.

BACKGROUND OF THE INVENTION

1. Field of the Invention

The present invention relates to a drive device for mirrors utilized in an optical system, such as an optical deflector for optical communications, an optical scanner, or a data recording and playback system for recording and/or playing back data relative to an optical recording medium, such as, for example, a magneto-optical disk drive, write-once-read-many (WORM) disk drive, phase-change disk drive, CD-ROM, DVD, or optical card.

2. Description of the Related Art

In an optical system, such as a data recording and playback system for recording and/or playing back an optical recording medium, such as CD-ROM, DVD, or optical card, a magneto-optical disk drive, WORM disk drive, phase-change disk drive, or an optical system, such as an optical scanner, a drive device for an optical element, such as a mirror, is utilized to skew a beam of light.

As an optical element support device, for example, a galvano-mirror 80 like that shown in FIG. 1 is disclosed in Japanese Unexamined Patent Application Publication No. 11-211969.

A hole is provided in the central part of a bottom wall portion 82 of a press-formed base member 81, the bottom surface of this bottom wall portion 82 is spherical, and is used as the mounting surface 83 for mounting and adjusting this galvano-mirror 80.

A spring assembly 84 is housed within this base member 81. This spring assembly 84 is constituted from a cantilevered fixed member 85, and a movable member 86, which is supported in a freely moving condition on the front surface side of this fixed member 85. This movable member 86 is supported by springs 87, 88 in a freely rotating condition around a mirror rotating axis R in parallel to axis Y as shown in FIG. 1.

A mirror 89 is mounted to the front surface of this movable member 86, a movable coil 90 is mounted so as to enclose the circumference of this mirror 89, and these movable member 86, mirror 89 and movable coil 90 constitute a movable portion.

Furthermore, the base member 81 of the front surface side of the mirror 89 is notched and open, and an open portion 91 through which light passes is formed.

A lead wire 92 is lead through from the upper and lower portions, respectively, of the above-mentioned movable coil 90.

Further, magnets 93 are arranged and affixed in the empty space portions on both sides of the spring assembly 84. Furthermore, each part in which each magnets 93 is housed forms a flat-shaped flat portion 94.

The above-mentioned springs 87, 88 have an S-shaped spring portion 95, which is shaped like the letter S, a not-shown reinforced conducting portion, which is formed by connecting to this S-shaped spring portion 95, and a terminal portion.

Thus, this galvano-mirror 80 is constituted such that the mirror 89 and movable coil 90 are affixed to the movable member 86, the opposite ends of the movable member 86 are linked to the fixed member 85 by means of two S-shaped springs 87 and 88, two magnets 93 are arranged in the base member 81 side facing two sides of the movable coil 90, the mirror 89 is supported in a rotatable condition around one axis, and the mirror 89 can be driven and rotated by applying current to the movable coil 90.

In a drive device for an optical element such as a mirror, there are cases when it is desirable to line up a plurality of optical element drive devices corresponding to a plurality of optical paths. When a plurality of galvano-mirrors 80, which are treated as the prior art optical element drive device shown in FIG. 1, are lined up, the pitch cannot be reduced. Another problem is that the number of parts increases.

Further, it is difficult to arrange systematically and compactly a plurality of the mirrors in the prior art shown in FIG. 1.

SUMMARY OF THE INVENTION

An object of the present invention is to provide a drive device for small optical elements, which is either capable of reducing the pitch of a plurality of optical elements, or has a small number of parts.

Another object of the present invention is to provide a drive device for optical elements, which is well-suited to miniaturizing and arranging a plurality of optical elements.

The present invention has a plurality of movable members to which a plurality of optical elements, having a function for changing the path of light, are attached, respectively; a plurality of support mechanisms for supporting the above-mentioned plurality of movable members independently in a displacable condition; a plurality of drive mechanisms for driving the above-mentioned plurality of movable members; and a fixed member to which the above-mentioned plurality of movable mechanisms are attached, and is constituted such that the above-mentioned plurality of drive mechanisms have coils and magnets, and by using at least a part of the above-mentioned plurality of drive mechanisms in common for driving at least two of the movable members of the above-mentioned plurality of movable members, it is possible to reduce the number of parts, and to reduce the costs of miniaturization and assembly.

Further, by providing the present invention with a plurality of movable members to which a plurality of optical elements, having a function for changing an optical path, are attached, respectively; a plurality of support mechanisms for supporting the above-mentioned plurality of movable members in a rotatable condition; a common fixed member, which provides a plurality of storage portions for respectively storing each of the movable portions respectively supported by the above-mentioned support members; a plurality of drive mechanisms for magnetically and independently driving the above-mentioned plurality of movable portions, a plurality of optical elements can readily be assembled in a state, wherein this plurality of optical elements are arranged at a small pitch by storing the movable portions respectively supported by the support members in the plurality of storage portions formed in the common fixed portion.

Further, the present invention has a plurality of movable members respectively comprising optical elements, which have functions for changing an optical path; a plurality of support mechanisms for supporting the plurality of movable members independently in a displacable condition; and a plurality of magnetic drive mechanisms for driving the above-mentioned plurality of movable members, and is constituted such that by forming at least one member from the magnetic members constituting the above-mentioned plurality of movable members, plurality of support members, and plurality of magnetic drive mechanisms, as a common member, it is possible to reduce the number of parts, and to reduce the costs of miniaturization and assembly.

BRIEF DESCRIPTION OF THE DRAWINGS

FIG. 2 is a schematic block diagram of an optical path switching apparatus comprising a first embodiment;

FIG. 3 is a perspective view showing the overall constitution of the galvo unit of the first embodiment;

FIG. 4 is a cross-sectional view showing the structure of one galvano-mirror;

FIG. 5 is a perspective exploded view of the movable portion of the galvano-mirror of FIG. 4;

FIG. 6A through FIG. 9 are related to a second embodiment of the present invention, and FIG. 6A and FIG. 6B are diagrams showing the overall constitution of a galvo unit of the second embodiment;

FIG. 7 is a perspective view showing a galvano-mirror being stored and affixed in a housing;

FIG. 8 is a diagram showing the structure of one galvano-mirror;

FIG. 9 is a diagram showing sensors arranged on both sides of a plane comprising incident light and reflected light;

FIG. 10 through FIG. 19B are related to a third embodiment of the present invention, and FIG. 10 is a perspective exploded view of the constitution of a galvo unit of the third embodiment;

FIG. 11 is a cross-sectional view showing the structure of a galvo unit;

FIG. 12 is a perspective view showing the backside of a galvano-mirror;

FIG. 13 is a schematic diagram showing an example of a constitution of an optical path switching apparatus constituted by combining the first and second embodiments;

FIG. 14 is a block diagram of FIG. 13 as seen from above;

FIG. 15 is a schematic perspective view showing a more concrete example of a constitution of an optical path switching apparatus;

FIG. 16 is a schematic diagram of FIG. 15 as seen from the side direction;

FIG. 17 is a diagram showing an example of a constitution of another optical path switching apparatus;

FIG. 18 is a perspective view showing the constitution of FIG. 17; and

FIG. 19A and FIG. 19B are diagrams showing the constitution of a coupling device in FIG. 17.

DESCRIPTION OF THE PREFERRED EMBODIMENTS

The embodiments of the present invention will be explained hereinbelow by referring to the figures.
(First Embodiment)

A first embodiment of the present invention will be explained in detail by referring to FIG. 2 through FIG. 5.

Figure 1:
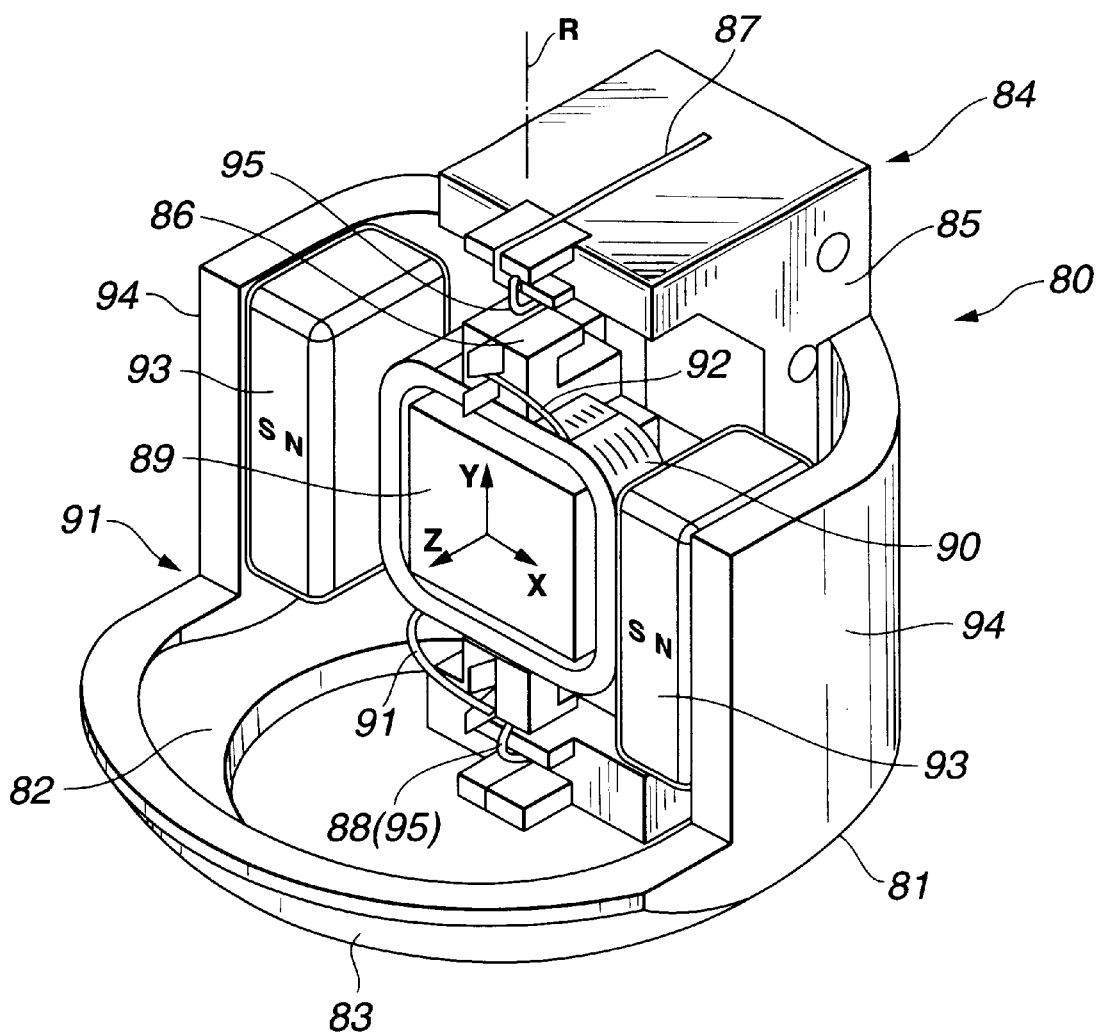
FIG. 1 is a diagram showing the constitution of a galvano-mirror of the prior art.
Figure 2:
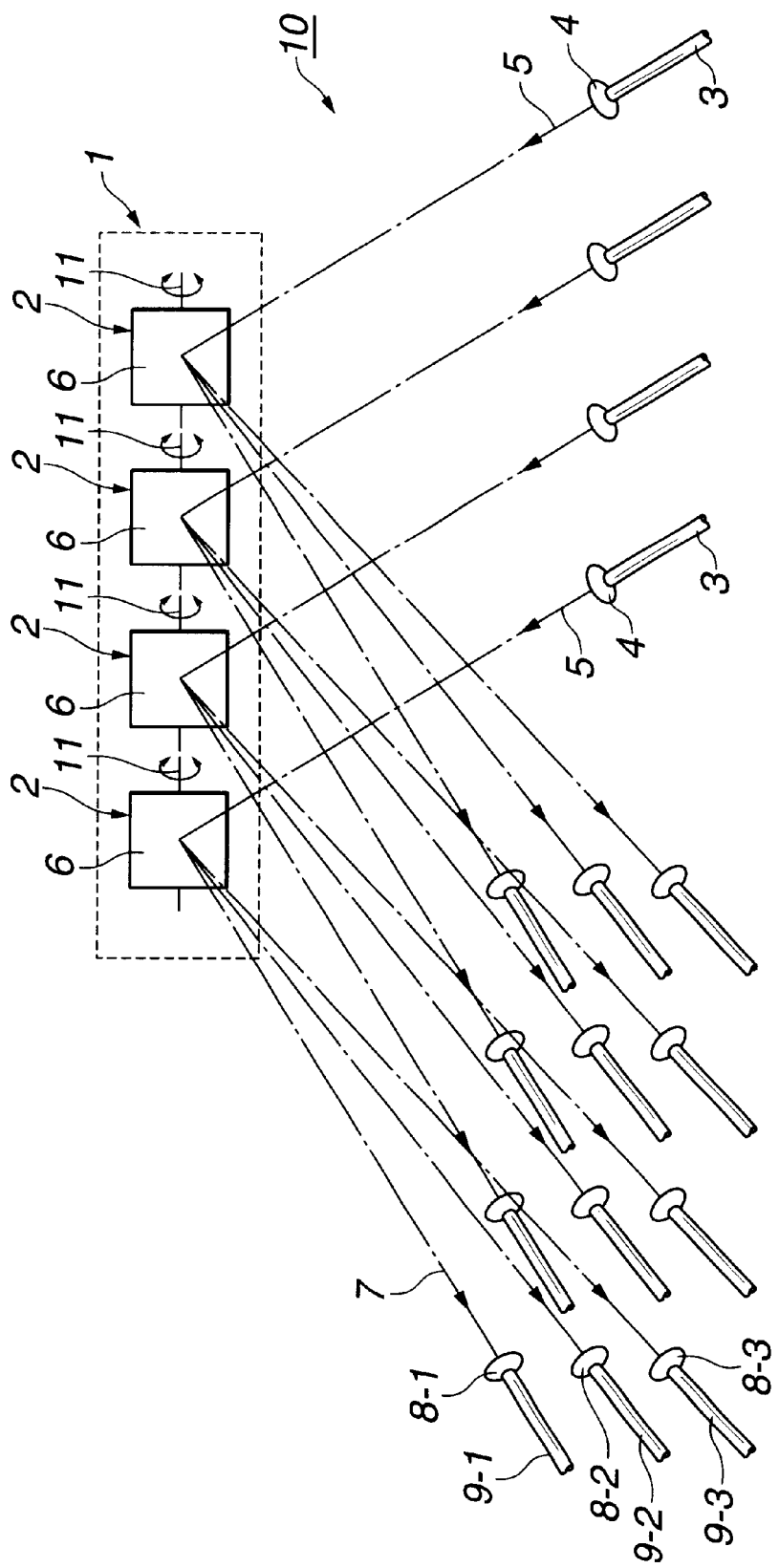
FIG. 2 through FIG. 5 are related to a first embodiment of the present invention.

As shown in FIG. 2, an optical path switching apparatus 10 for optical communications comprises a galvo unit 1 of the first embodiment (as an optical element drive device of the present invention). This galvo unit 1 comprises a plurality of galvano-mirrors, for example, four galvano-mirrors 2.

And then a light emitted from one optical fiber 3 is formed into a collimated beam by a lens 4, and this incident light 5 is projected at a mirror 6, which constitutes a galvano-mirror 2, and which changes the path of the light by reflecting it, and this reflected light 7 is selectively irradiated onto three lenses 8-1 through 8-3, and is irradiated onto fibers 9-i opposite each lens 8-i (i=1–3).

By tilting mirror 6 around a rotation axis 11 (causing rotational displacement), light reflected by mirror 6 is deflected in the up-down direction as shown in FIG. 2, selectively irradiated onto three lenses 8-1, 8-2, 8-3, and an optical fiber, which outputs light emitted from a fiber 3 at irradiating side, is selected from among three optical fibers 9-1, 9-2, 9-3.

Each of four sets includes a fiber 3, lens 4, galvano-mirror 2, three lenses 8-1, 8-2, 8-3, and three fibers 9-1, 9-2, 9-3 and four sets are arranged in lines. Four galvano-mirrors 2 are lined up in the direction of the rotation axis 11.

Figure 3:
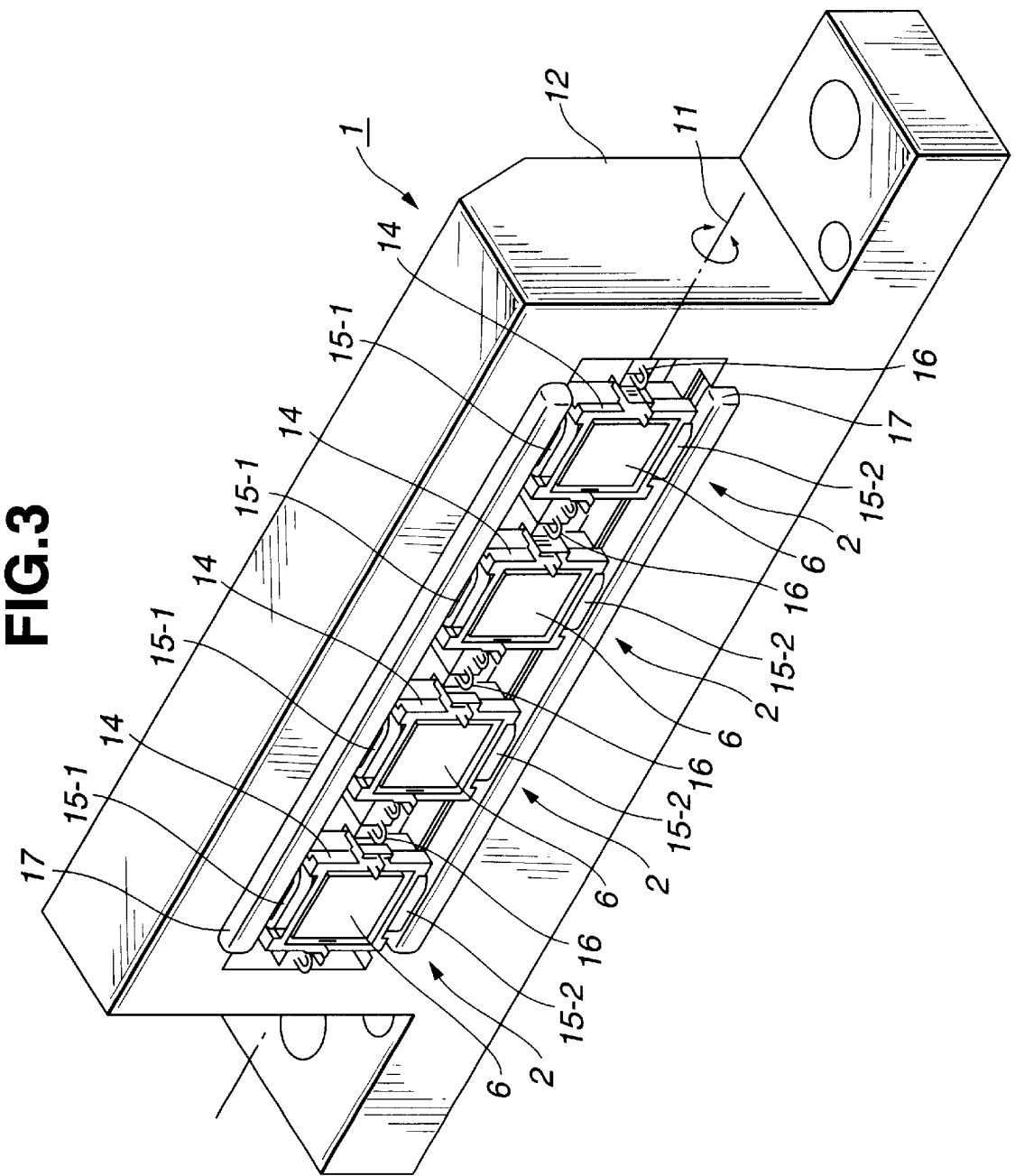

The four galvano-mirrors 2 are mounted in a housing 12 as a fixing member (See FIG. 3) and constitute a galvo unit 1. As shown in FIG. 3, this galvo unit 1 is constituted such that, for example, a housing 12 is formed in a substantially rectangular parallelepiped-shaped member, which has the horizontal direction as the longitudinal direction, by providing a long concave storage portion in the horizontal direction of the front surface thereof, and the movable portions of four galvano-mirrors 2 are stored in this concave storage portion so as to be aligned at a predetermined pitch such that the rotation axis 11 of each sits on one straight line, and are supported by support members (specifically, springs 16), each of which forms the rotation axis 11.

Figure 4:
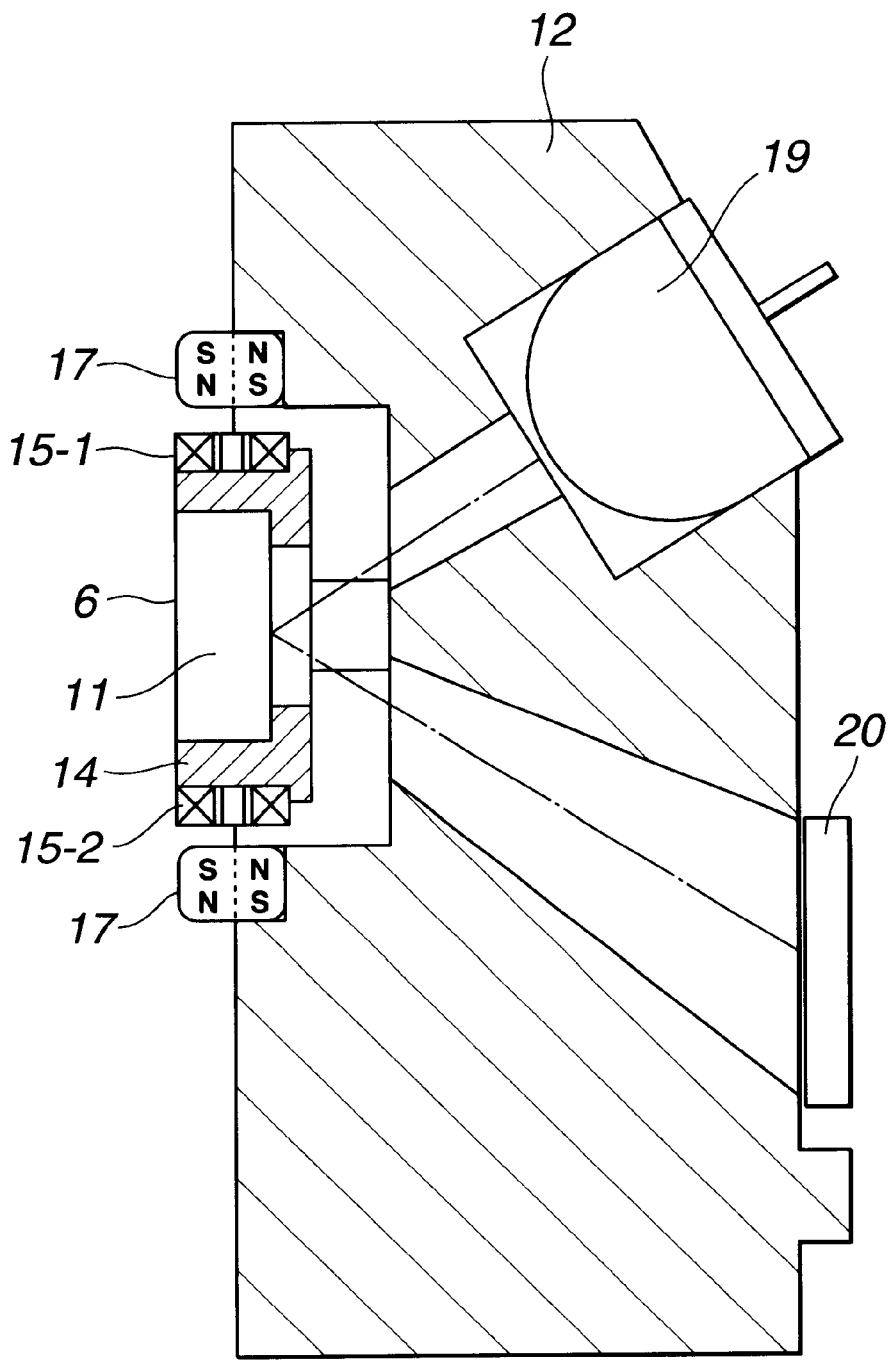
Figure 5:
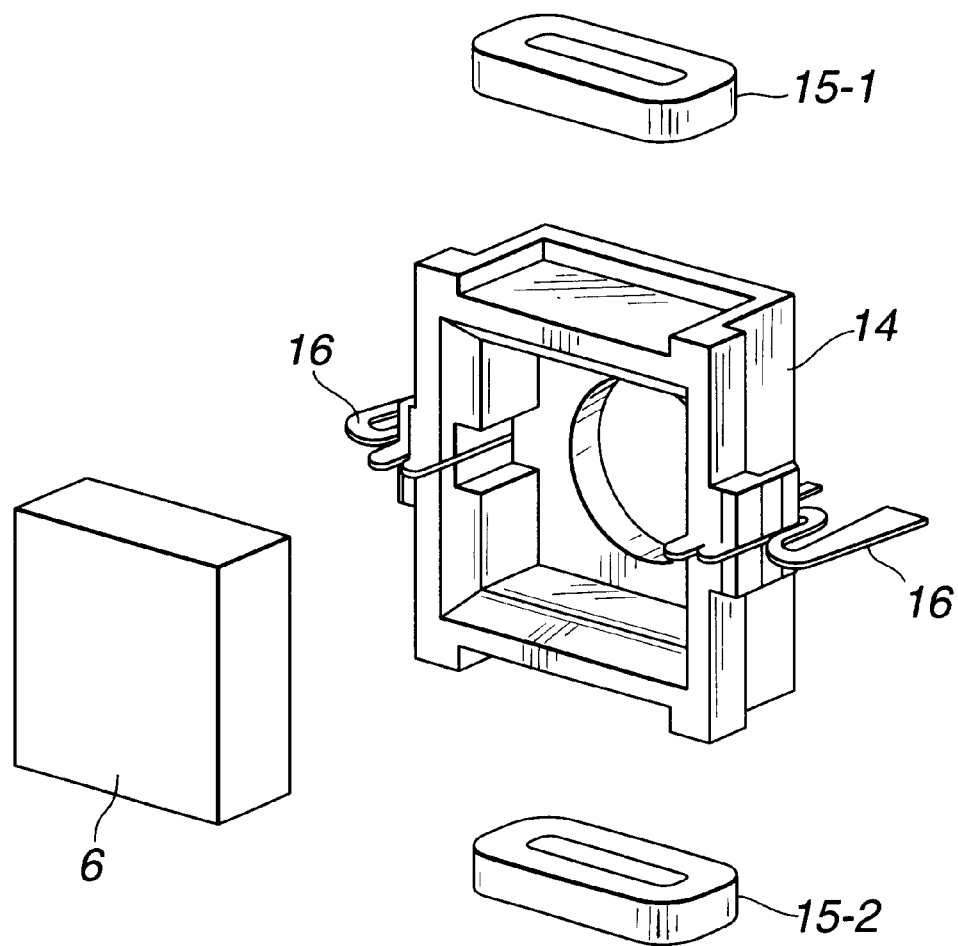

As shown in FIG. 3, FIG. 4 and FIG. 5, each mirror 6 (which has a 1.5-$\mu$m thick coating layer with high light reflectance, applied to the outer surface) is inserted in the center portion of the frame of a holder 14, which constitutes a square frame-like movable portion, and is affixed with adhesive.

Further, two coils 15-1, 15-2, which are wound in a rectangular shape, and which form a magnetic drive mechanism for magnetically driving the respective movable portions, are stored in concave portions disposed on the upper surface and lower surface of the holder 14, and are affixed with adhesive. Further, springs 16, which, for example, are etched from beryllium copper foil and have S-shaped curved portions, are mounted in a fixed condition by insert molding to the central portions of both the right and left sides of the holder 14, and the end portions of the springs 16, which protrude from both sides of the holder 14, are wide.

The holders 14 and the housing 12 are formed from a non-conductive plastic, such as, for example, a polycarbonate containing glass fibers and titanic acid whiskers, or a liquid crystal polymer. The eight springs 16 used in one galvo unit 1 are insert molded when the four holders 14 are formed. By making an opening in the portion of the housing 12 on the right side of the holder 14 shown FIG. 4, the eight springs 16 can also be insert molded when forming the four holders 14 and one housing 12.

And, as shown in FIG. 3, each spring 16 becomes a support member for supporting a movable portion in a torsionally deformable condition along the rotation axis 11.

In the housing 12, two magnets 17 are affixed as magnetic members (more specifically, strong magnetic members) in positions facing the two coils 15-1, 15-2. As shown in FIG. 4, each magnet 17 is polarized into two poles such that each force acts in the same direction corresponding to the direction of the current of a side of each coil, (the directions of current of two coils 15-1, 15-2 are opposite each other in the horizontal direction) so that mutually opposite direction forces act on the upper and lower coils 15-1 and 15-2.

Further, each of the two magnets 17 is formed in the longitudinal direction in which the four galvano-mirrors 2 are lined up so as to face all the four coils 15-1 (or 15-2) in the movable portions of the four galvano-mirrors 2, which are stored and held such that each is aligned inside the concave storage portion formed in the horizontal direction in housing 12.

And, the galvo unit 1 is constituted such that applying current to the two coils 15-1 and 15-2, which constitute a pair, enables torque to be generated around the rotation axis 11 relative to the two coils 15-1 and 15-2 by mutual interaction with the magnetic field from the magnets 17. By torsionally deforming the springs 16, which resiliently provide support in the direction of this rotation axis 11, and by rotationally displacing around the rotation axis 11 a mirror 6, which is mounted to the holder 14 constituting a movable portion, variable control of the angle of tilt of the mirror 6 is enabled.

Furthermore, as described hereinabove, the rotation axis 11 for each galvano-mirror 2 is parallel to the direction of alignment of the four galvano-mirrors 2. Further, the respective movable portions of the four galvano-mirrors 2 are each independently supported by the springs 16.

As shown in FIG. 4, for example, on the back side of mirror 6, an LED (light-emitting diode) 19 and a PSD (photodetector) 20 are affixed to the housing 12. A light from the LED 19 is projected to the back surface of mirror 6, and the reflected light thereof is incident upon the PSD 20. The constitution is such that, because the light on the PSD 20 moves in the up-down direction as shown in FIG. 4 according to the angle of tilt when the mirror 6 skews around the rotation axis 11, it is possible to obtain from this PSD 20 a detection signal corresponding to the angle of tilt.

This embodiment is constituted so as to reduce the number of parts, lower costs, and facilitate miniaturization by using such a structure as four galvano-mirrors 2 use the magnets 17 in common. The magnets 17 constitute fixed-side drive members used together with coils 15-1, 15-2, which are drive members for driving the respective movable portions of the four galvano-mirrors 2.

Further, this embodiment is constituted so as to facilitate miniaturization and make assembly easier than a device that groups individual galvano-mirrors together as in a conventional example, by utilizing a structure, which systematically arranges, stores, and supports with support members the movable portions of a plurality of galvano-mirrors 2 in a concave storage portion formed inside a common housing 12.

Further, this embodiment is constituted so as to enable the minimization of irregularities among products, and to make adjustment work easy by utilizing a structure, which systematically arranges a plurality of galvano-mirrors 2.

The operation of this embodiment will be explained in accordance with a constitution such as this.

A galvo unit 1 is arranged as shown in FIG. 2, and incident a light 5 from, for example, left-most optical fiber 3 is irradiated on a mirror 6 of a left-most galvano-mirror 2 of the galvo unit 1, and a current value applied to coils 15-1 and 15-2 and the polarization thereof are controlled by a detection signal of a PSD 20 such that the reflected light 7 thereof is irradiated on left-most optical fiber 9-1 of the desired three arranged optical fibers 9-1, 9-2, 9-3. Control is the same for other galvano-mirrors 2 as well.

In this case, since this embodiment systematically arranges and stores the respective movable portions of a plurality of galvano-mirrors 2 inside a common housing 12, the array pitch can be kept small and miniaturization can be achieved, and, in addition, the arrangement of the incident-side optical fiber 3 and lens 4, and the arrangement of the optical path switching-side lens 8 and optical fiber 9 can be performed systematically, and the optical path switching apparatus 10 can be made compact.

Further, adjustments and so forth can be made simple (When a plurality of individual galvano-mirrors are combined as in conventional examples, and constituted as shown in FIG. 2, the job of setting the individual galvano-mirrors becomes troublesome.).

Further, because this embodiment adopts a structure, in which the fixed-side magnetic members constituting drive mechanisms for a plurality of galvano-mirrors 2 are used in common by the plurality of galvano-mirrors 2, the number of parts can be reduced, assembly can be made easy, and costs can be reduced.

This embodiment has the following effects.

Since this embodiment adopts a structure, which puts one magnet 17 to combined use in the rotational driving of the movable portions of four galvano-mirrors 2, the number of magnets 17 can be markedly reduced, and parts and assembly costs can be lowered.

Because the movable portions of four galvano-mirrors 2 are respectively supported in a freely movable condition by support members, four mirrors 6 can be skewed independently.

Further, because the movable portions of the four galvano-mirrors 2 each have tilt sensors for detecting the tilt of the respective movable portions of the four galvano-mirrors 2, skewing control is easy, and skewing mirror 6 to make it correspond to three lenses 8-1, 8-2, 8-3 can be done easily.

Further, four holders 14 can be integrally molded together with springs 16. It is therefore possible to carry out forming, which makes for outstanding volume production capabilities, and enables the respective galvano-mirrors 2 to be arrayed having a small pitch. It is also possible to increase the precision of the mutual positions, skews and pitches of the four galvano-mirrors 2.

(Second Embodiment)

Next, a second embodiment of the present invention will be explained by referring to FIG. 6A through FIG. 9. Furthermore, portions other than those explained hereinbelow are the same constitution as the first embodiment.

Figure 6A:
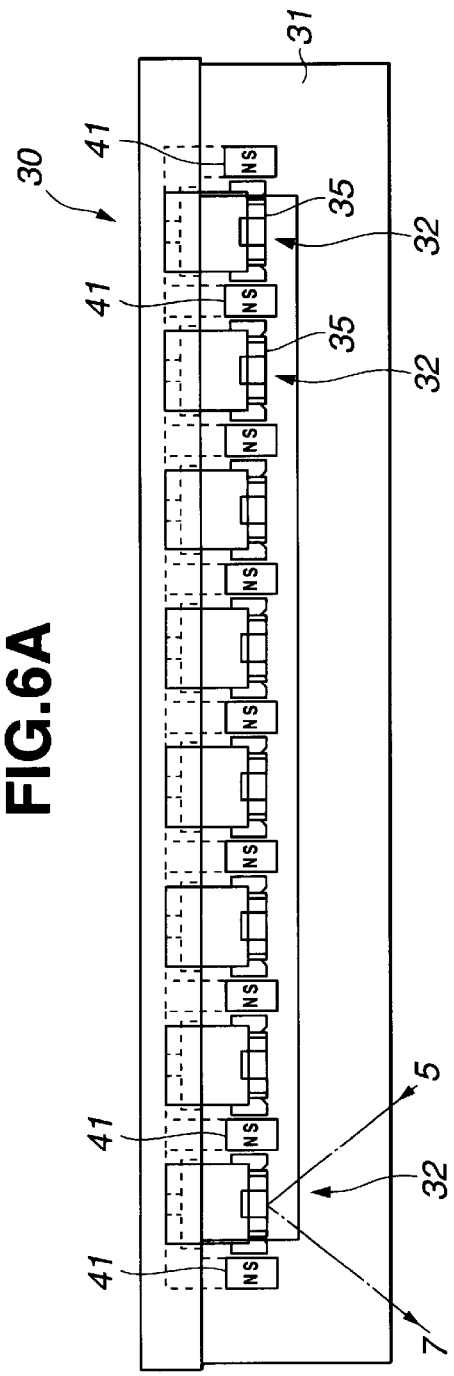
Figure 6B:
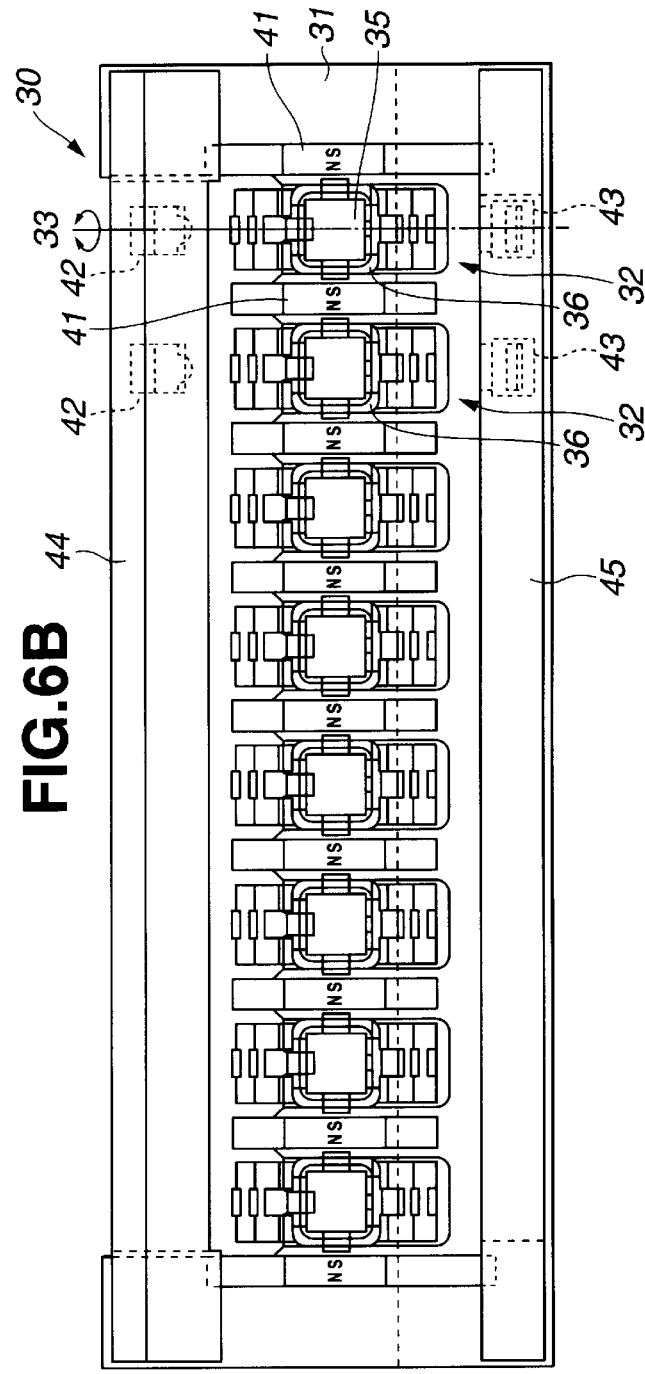

As shown in FIG. 6A and FIG. 6B, a galvo unit 30 of the second embodiment is constituted such that, for example, eight galvano-mirrors 32 are arranged and stored in a common housing 31. Furthermore, FIG. 6A shows a diagram of the second embodiment as seen from above without skew sensors, and FIG. 6B shows a front view.

Figure 7:
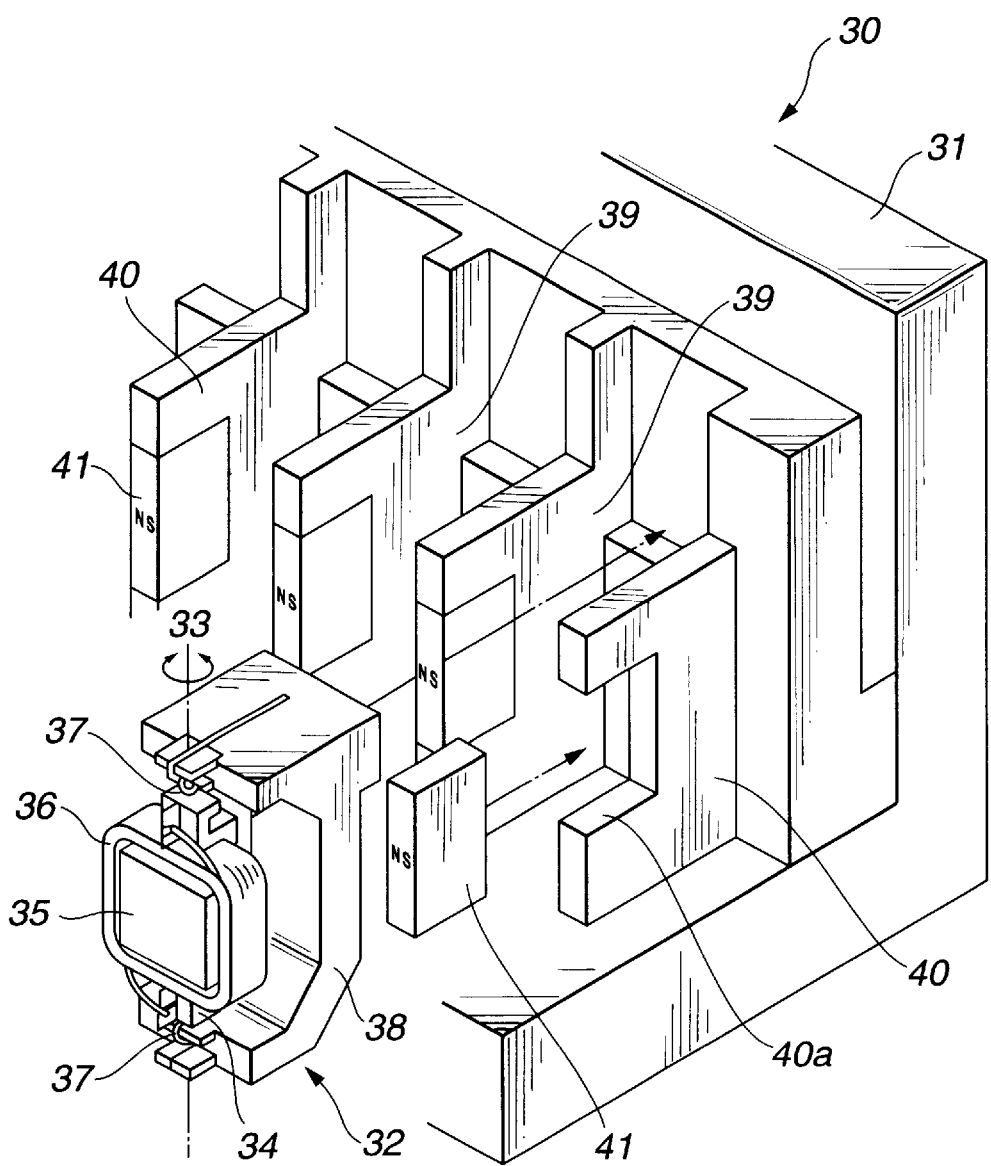

As shown in FIG. 7, the respective galvano-mirrors 32, for example, are systematically arrayed in the left-right direction perpendicular to the up-down direction of a rotation axis 33. In other words, in this embodiment, the galvano-mirrors 32 are arrayed perpendicular to the rotation axis 33. (By contrast, in the first embodiment, the galvano-mirrors 2 were arrayed parallel to the rotation axis 11.)

The movable portion of each galvano-mirror 32 is formed by affixing a square or rectangular plate-like mirror 35 with adhesive or the like to the center of a mirror holder 34, and affixing a square frame-like coil 36 such that it makes contact with the circumference thereof.

The top and bottom ends of this mirror holder 34 are connected to a galvano-mirror holder 38 via springs 37, which constitute the movable portion support members, and the mirror holder 34 of the movable portion is supported in a torsionally deformable condition around the rotation axis 33 by the springs 37. Eight holders 38 are positioned and affixed in respective holder concave storage portions 39 respectively formed at a predetermined pitch in the horizontal direction of housing 31.

In the protruding portions 40 at both sides of the holder concave storage portion 39, magnet storage portions 40a are provided so as to face the coil side in a direction that parallels the rotation axis 33 of the coil 36 of the galvano-mirror 32, which is stored and affixed in this holder concave storage portion 39, and a rectangular, plate-shaped magnet 41 is stored and affixed, respectively, therein.

That is, the magnet 41 is arranged between two adjacent coils 36, and the constitution is such that this magnet 41 is used by the coils 36 of the two galvano-mirrors 32 between which the magnet 41 is aligned.

Furthermore, a total of nine magnets 41 are utilized with the eight galvano-mirrors 32, and of these, the two magnets 41 at either end of the housing 31 are used exclusively for the galvano-mirrors 32 at either end, but the seven magnets 41 other than these serve a dual purpose.

The orientations of the magnetic poles of the two magnets 41 utilized for one galvano-mirror 32 are such that opposite poles are faced, and, as shown in FIG. 6 and FIG. 7, the orientations of the magnetic poles of the nine magnets 41 are oriented in the same direction. Thus, because the magnetic poles of all the galvano-mirrors 32 are the same even though one magnet 41 is used for two adjoining galvano-mirrors 32, making the polarization of all the coils 36 the same will enable each galvano-mirror 32 to be driven independently and in the same manner.

Further, as shown in FIG. 6B and in more detail in FIG. 8, sensors for detecting the tilt of a mirror 35 are provided in positions diagonally above and below each mirror 35, respectively. Furthermore, in FIG. 6B, only two sensors on the right side are shown, but the other sensors are provided in the same manner.

Figure 8:
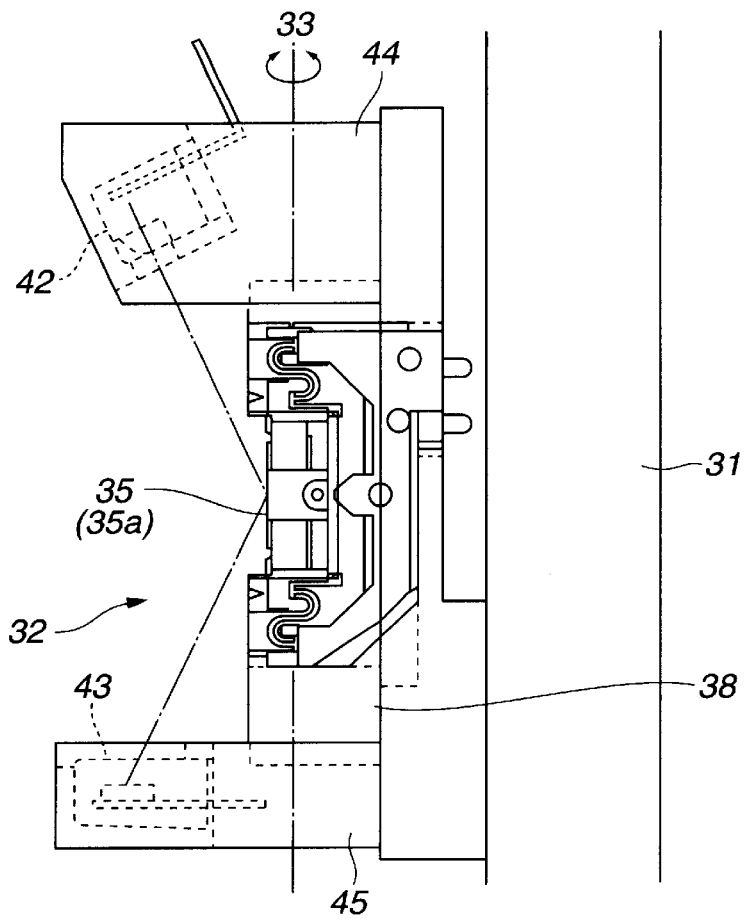

As shown in FIG. 8, an LED holder 44 and a PD holder 45 for mounting an LED 42 and a PD 43, respectively, are affixed to the upper side and lower side of holder 38 in the housing 31.

Furthermore, eight LED 42 are mounted in one LED holder 44, and eight PD 43 are also mounted in one PD holder 45.

Figure 9:
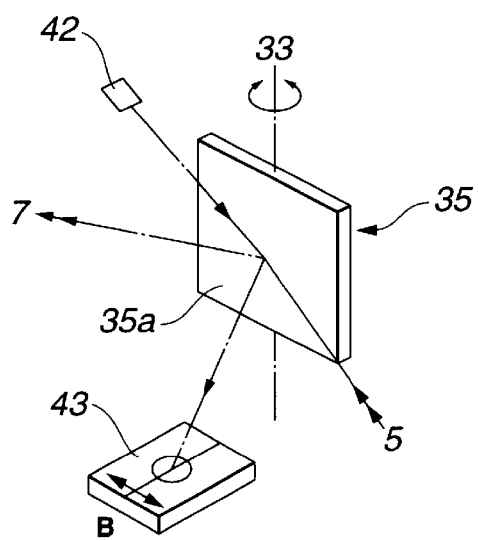

As shown in FIG. 9, a light emitted from the LED 42 is reflected by a reflecting surface 35a of the mirror 35 and irradiated onto the PD 43, the surface of which is partitioned in two. When mirror 35 rotates around the rotation axis 33, the light incident on the PD 43 moves in the direction of one of the two halves of the partitioned PD 43 (the directions of arrow B). Thus, if the differential output of the two light-receiving surfaces of the partitioned PD 43 is detected, a signal corresponding to the angle of rotation of the mirror 35 can be produced.

An incident light 5 for switching an optical path having an optical communications signal, which is emitted from the optical fiber 3 (See FIG. 2) from a direction perpendicular to the rotation axis 33 of the mirror 35, is irradiated onto the reflecting surface 35a of the mirror 35, and is reflected. The plane comprising this incident light 5 and reflected light 7 is perpendicular to the rotation axis 33. By contrast, the plane formed by the light from the LED 42, used as a sensor, via the mirror 35 to the PD 43 is parallel to the rotation axis 33, and perpendicular to the plane comprising the incident light 5 and the reflected light 7. Further, the constitution is such that the LED 42 and the PD 43 are arranged so as to sandwich the plane comprising the incident light 5 and the reflected light 7.

Therefore, the LED 42 and the PD 43 can be easily arranged in locations, which do not obstruct the incident light 5 and the reflected light 7.

Furthermore, although the direction in which the galvano-mirrors 32 are arrayed relative to the direction of the rotation axis 33 differs from that of the first embodiment, in this embodiment, too, the lenses 8-1 through 8-3 and optical fibers 9-1 through 9-3 of FIG. 2 are arranged in the direction in which the reflected light 7 proceeds within the plane comprising the incident light 5 and the reflected light 7.

As for the effects of this embodiment, the number of galvano-mirrors 32 differs, but by controlling the current value applied to the coil 35 of each galvano-mirror 32, and the polarization thereof, by the differential output of PD 43 instead of the output signal of PSD 20, switching can be performed such that a reflected light is irradiated onto a desired optical fiber 9-1 through 9-3.

This embodiment has the following effects.

Dual utilization of the magnets 41 is possible even though the array of the galvano-mirrors 32 (mirrors 35) is in a direction perpendicular to the rotation axis 33.

Further, since the constitution is such that the respective galvano-mirrors 32 are stored and affixed in storage portions sytematically formed in the common housing 31, a galvo unit, which has a plurality of galvano-mirrors 32 in a systematically arrayed condition, can be miniaturized, and, in addition, manufacturing can be done more simply and at lower cost.

Further, the LED 42 and the PD 43, which form an angle sensor of the mirror 35, can be readily arranged in locations that do not obstruct the incident light 5 and the reflected light 7.

(Third Embodiment)

Next, a third embodiment of the present invention will be explained by referring to FIG. 10 through FIG. 19B. Furthermore, portions other than those explained hereinbelow are the same constitution as the first embodiment.

Figure 10:
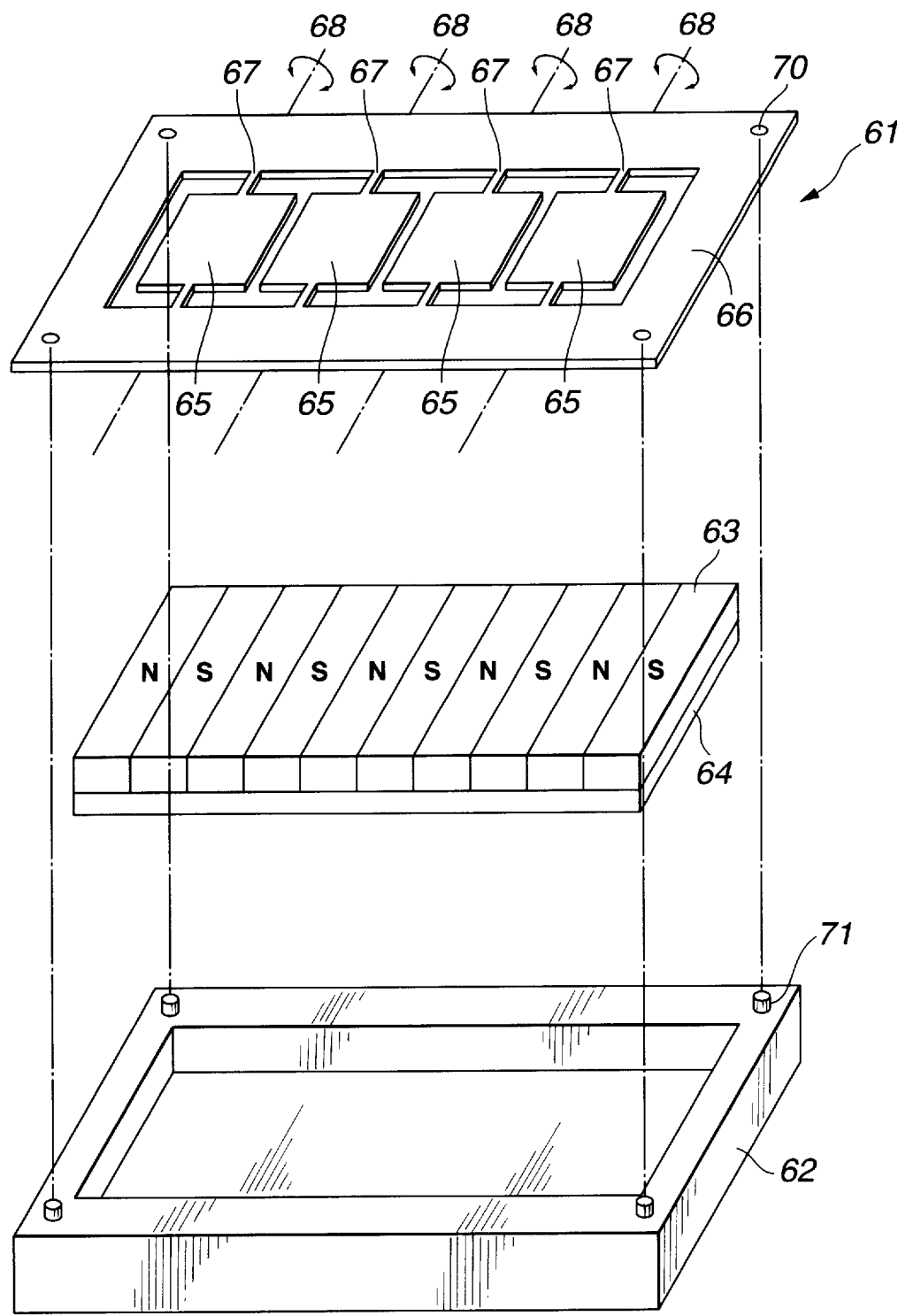
Figure 11:
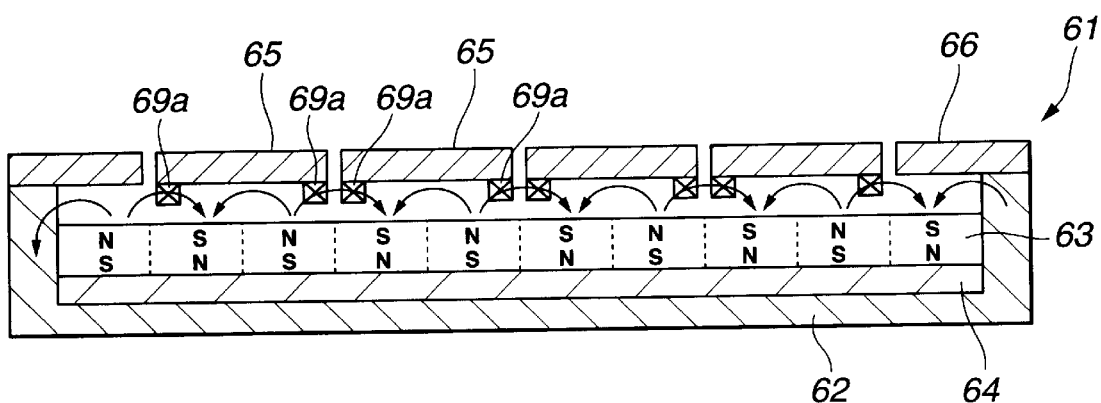

As shown in FIG. 10 and FIG. 11, a galvo unit 61 of the third embodiment is formed by storing and affixing magnets 63 by way of a common yoke 64 in a housing 62 having a bottom, and affixing a mirror plate 66, which provides a plurality of mirrors 65, and which constitutes a movable portion, so as to face these magnets 63.

For example, the four mirrors 65 are formed in a mirror plate 66 by etching a thin plate of stainless steel, polysilicon or single-crystal silicon. In this case, each square or rectangular plate-like mirror 65 is etched so that a linear part remains in the center in the left-right direction of the top side and bottom side thereof, and each mirror 65 is resiliently connected to the mirror plate 66 and supported in a rotationally deformable condition by springs 67 formed by these linear parts. In other words, the respective mirrors 65 are supported by treating the central axis that passes through each spring 67 as a rotation axis 68.

Figure 12:
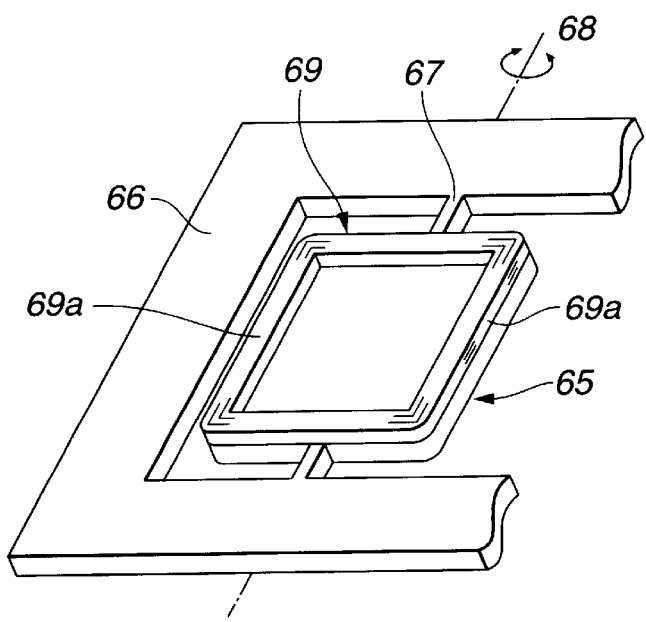

Reflectance is enhanced by forming a coating layer of, for example, metal or a multi-layered dielectric film on the surface constituting the reflecting surface of each mirror 65. An insulating layer is formed on the surface of the backside of the reflecting surface by forming a thin polyimide coating layer, and a coil 69 shown in FIG. 12 is formed by electroforming.

As shown in FIG. 10, this mirror plate 66 is provided with positioning holes 70 at each of four corner locations, and, using the respective positioning holes 70 as a reference, is positioned and affixed by inserting thereinto pins 71 provided at the four corners of the upper surface of the housing 62.

Beneath the mirrors 65, a member, which attaches the yoke 64 to one magnet 63, which is polarized at 10 poles in the forming direction in which a plurality of mirrors 65 are formed, is stored and affixed inside housing 62.

As shown in FIG. 11, the effective sides 69a of the coil 69 are positioned on the boundaries of the magnetic poles of the magnet 63. Thus, the direction of a magnetic field acting on the effective side 69a constitutes a substantially horizontal direction of FIG. 11. Therefore, when current is applied to the coil 69, currents of opposite directions flow through the two effective sides 69a of each coil 69, thus generating torque, which cause the mirror 65 to rotate around the rotation axis 68 thereof.

The constitution is such that magnetic flux from adjacent magnetic poles acts in common on the two coils 69 used in the two adjacent mirrors 65.

This embodiment has the following effects.

Because one magnet 63 is being used to drive a plurality of mirrors 65, the number of parts is further reduced, and assembly is improved.

Since the constitution is such that the magnet 63 is arranged parallel to the reflecting surfaces of the mirrors 65, and the mirrors 65, magnet 63 and housing 62 are stacked in one direction, assembly becomes easy.

Further, a plurality of mirrors 65, which constitute movable portions, can be formed simply together with respective support members by etching the common mirror plate 66, and, in addition, the mirrors 65 can be formed and arrayed at a desired pitch, and a galvo unit, which arrays a plurality of small galvano-mirrors, can be realized at low cost.

The above-described embodiments are not limited to the constitutions of the embodiments. For example, the mirrors can be silicon mirrors, plastic molded products, or prisms.

Further, as long as there are two or more, there can be as many arranged galvano-mirrors or mirrors as desired.

Further, galvano-mirrors or mirrors arranged in a single row were described, but these mirrors can also be arranged two-dimensionally as a plurality of rows. For example, in FIG. 4 of the first embodiment, a 4×2 array of galvano-mirrors can be achieved by arranging yet another magnet (labeled 17a) above the top-side magnet 17, and arranging another row of four galvano-mirrors 2 between the top side magnet 17 and this magnet 17a. In this case, the top-side magnet 17 is used to drive the eight galvano-mirrors 2.

Further, the present invention is not limited to optical communications, but rather can also be applied to galvano-mirrors for use in optical disk pickup, such as, for example, various tracking via multi-track readouts using multiple beams, and can also be applied to optical scanners in other measuring instruments.

Figure 13:
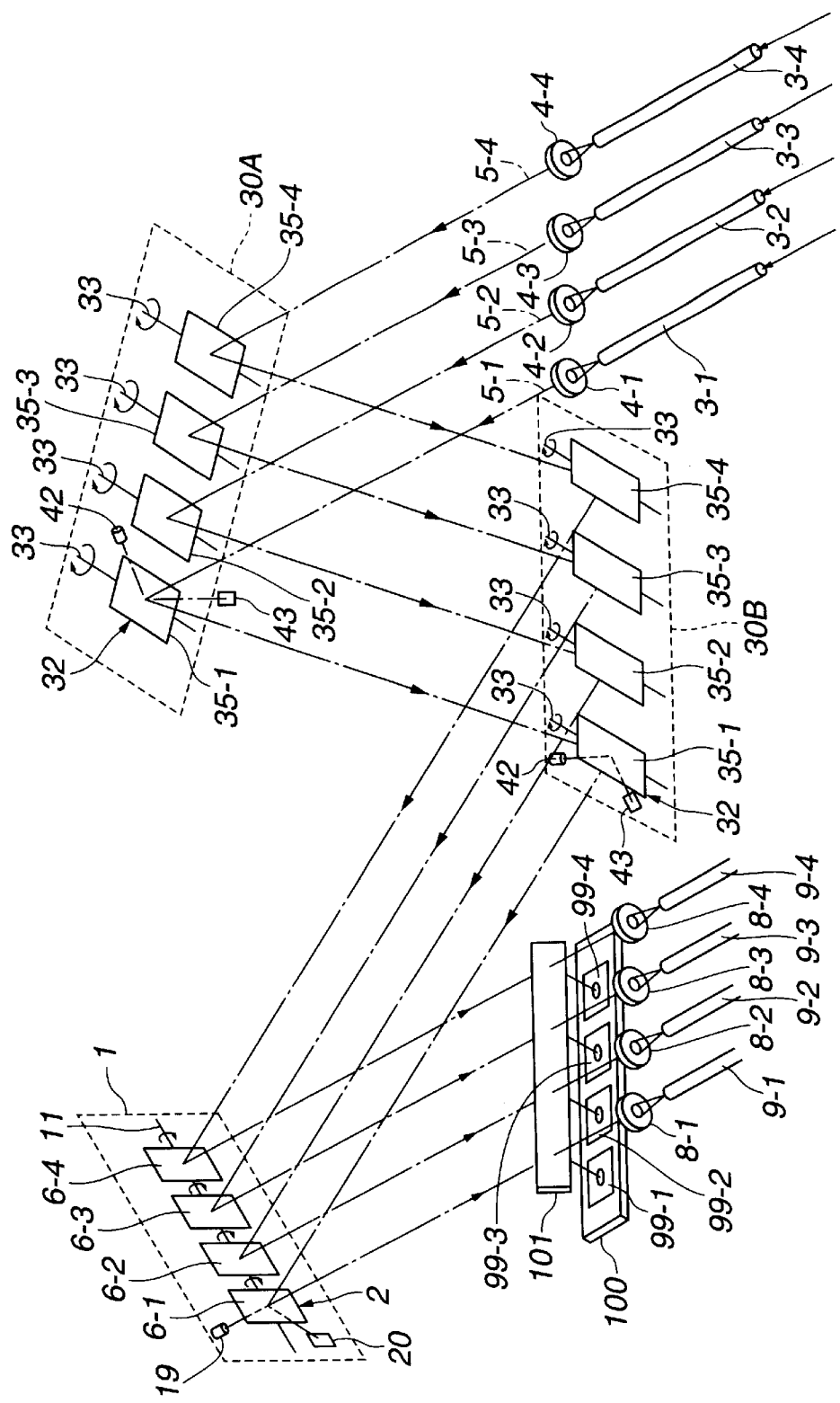

FIG. 13 shows an example of a constitution of an optical path switching apparatus for use as an optical switch for optical communications using a galvo unit 1 of the first embodiment and a galvo unit 30 of the second embodiment.

In this embodiment, signal light from four optical fibers for inputting is selectively switched to four optical fibers for outputting.

This embodiment utilizes two sets of one galvo unit 1 having four galvano-mirrors 2 of the first embodiment, and a device that only uses four galvano-mirrors 32 in the galvo unit 30 of the second embodiment.

In this embodiment, an optical path from an optical fiber for inputting to an optical fiber for outputting is arranged parallel to the array direction of the optical fiber for inputting.

Light emitted from each optical fiber 3-i (i=1 to 4) is formed into a collimated light by a lens 4-i, and this incident light 5-i is projected onto a mirror 35-i of a galvano-mirror 32-i of a galvo unit 30A having a vertical rotation axis 33. The reflected light thereof is projected onto mirror 35-1 in galvano mirror 32 of a galvo unit 30B having yet another vertical rotation axis 33.

The reflected light thereof is projected onto mirror 6-i of galvano-mirror 2 of the galvo unit 1, which has a horizontal rotation axis 11, the reflected light thereof is transmitted through a beam splitter 101 constituting a parallel flat plate and irradiated onto a lens 8-i, and irradiated once more onto an optical fiber 9-i.

Further, a portion of the light incident on the beam splitter 101 (around 1 to 20%) is reflected, and this reflected light is intercepted by a PSD 99-i arranged therebelow. Each PSD 99-i detects the position of the light on the light-receiving surface thereof in two directions. Four PSD 99-1 through 99-4 are arranged corresponding to four incident lights 5-1 through 5-4, and these PSD are arranged on a single substrate 100.

The position on PSD 99-i of a state, wherein the position of light to be irradiated on optical fiber 9-i is optimum, that is, the light spot irradiated from a lens 8-i to an optical fiber 9-i is positioned in the center of optical fiber 9-i, and the quantity of light transferred from optical fiber 9-i is the maximum, is stored.

The respective light for communications, which passed through the four optical fibers 3-1 through 3-4 is selectively irradiated onto any of the four optical fibers 9-1 through 9-4.

Figure 15:
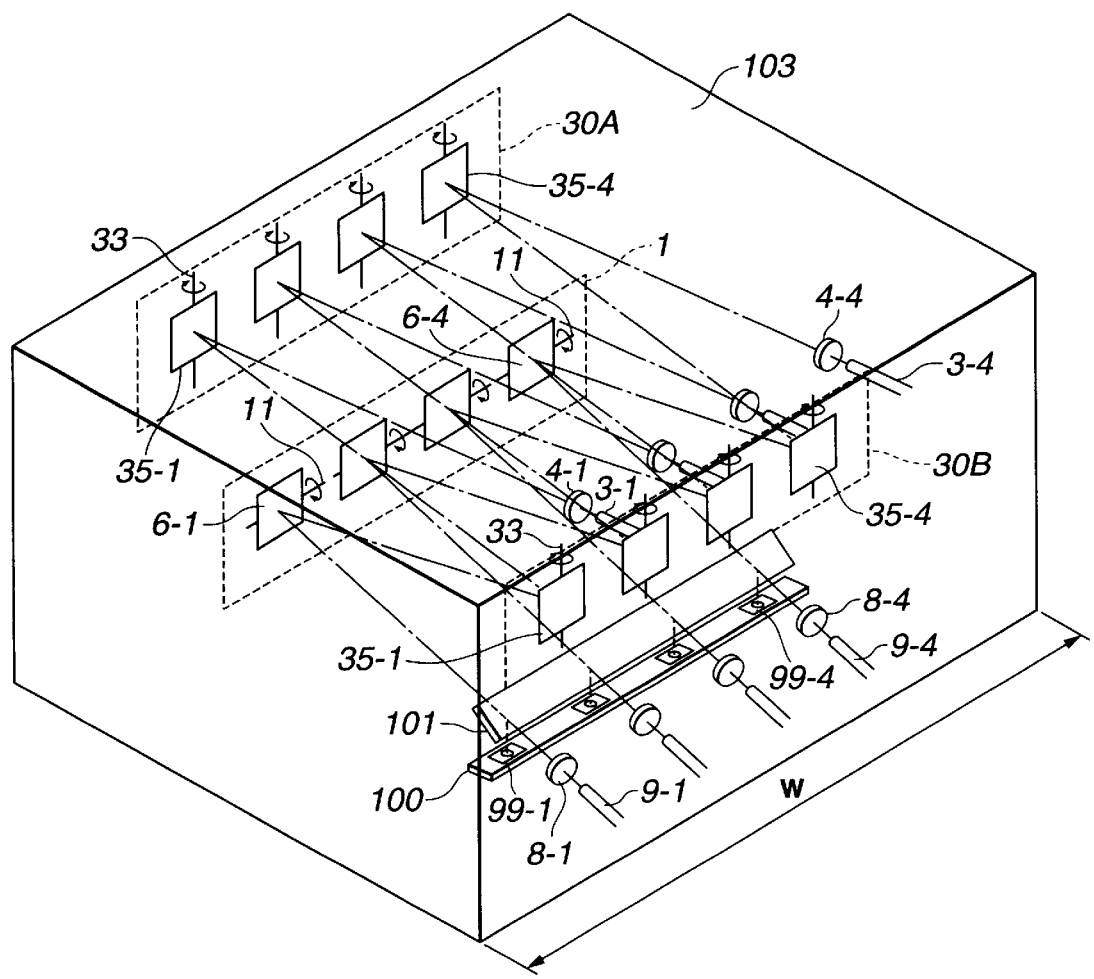

The optical fibers 3-1 through 3-4, lenses 4-1 through 4—4, galvo unit 30A, galvo unit 30B, galvo unit 1, beam splitter 101, lenses 8-1 through 8-4, and optical fibers 9-1 through 9-4 are arranged on a single plane, and are constituted as substantially letter M shapes as shown in FIG. 15. Further, these members are arranged inside optical switch box 103.

Therefore, the optical switch box 103 can be made thin. Optical fibers for inputting 3-1 through 3-4 and optical fibers for outputting 9-1 through 9-4 are arranged on the same plane of the optical switch box 103. Thus, the input-output optical fibers can be readily accessed even when the optical switch box 103 is arranged vertically or horizontally.

Next, the operation of the optical switch of this embodiment will be explained.

At initialization, as shown in FIG. 13, the output of an angle sensor constituting either an LED 42 and PD 43 or an LED 19 and PSD 20, which each mirror has, is maintained at an output such that the respective angles of the four mirrors 35-1 through 35-4 of the galvo unit 30A, the four mirrors 35-1 through 35-4 of galvo unit 30B, and the four mirrors 6-1 through 6-4 of galvo unit 1 become approximately 0 so that light from optical fibers 3-1 through 3-4 is incident on the optical fibers 9-1 through 9-4, respectively.

When light for communications is emitted from an optical fiber 3-i, the respective angles of a mirror 35-i of the galvo unit 30A, a mirror 35-i of the galvo unit 30B and a mirror 6-i of the galvo unit 1 are fine tuned so that the position of the light on a PSD 99-i is ideal. The respective mirrors are driven and controlled so as to maintain the output of the angle sensor arranged at each mirror so that the angles of the respective mirrors are maintained in this state.

Next, the operation for switching the light 5-1 of optical fiber 3-1 to the optical fiber 9-4 instead of 9-1 will be explained.

A mirror 35-1 of the galvo unit 30A uses output from its own angle sensor to tilt so as to achieve a predetermined angle θA. A mirror 35-4 of the galvo unit 30B uses output from its own angle sensor to tilt so as to achieve a predetermined angle θB. As a result of this, light reflected by the mirror 35-1 of the galvo unit 30A is directed toward the mirror 35-4 instead of the mirror 35-1 of the galvo unit 30B, and the reflected light thereof is directed toward a mirror 6-4 of the galvo unit 1.

The angles of the three mirrors are fine tuned so that the output of a PSD 99-4 is ideal, and the respective mirrors are driven and controlled so as to maintain the output of the angle sensor arranged at each mirror so that the angles of the respective mirrors are maintained in this state.

As a result of this, the light 5-1 outputted from an optical fiber 3-1 is switched from optical fibers 9-1 to 9-4 and outputted.

Similarly, it becomes possible for the respective communications lights that have passed through the four optical fibers 3-1 through 3-4 to be selectively irradiated onto any of the four optical fibers 9-1 through 9-4.

Figure 14:
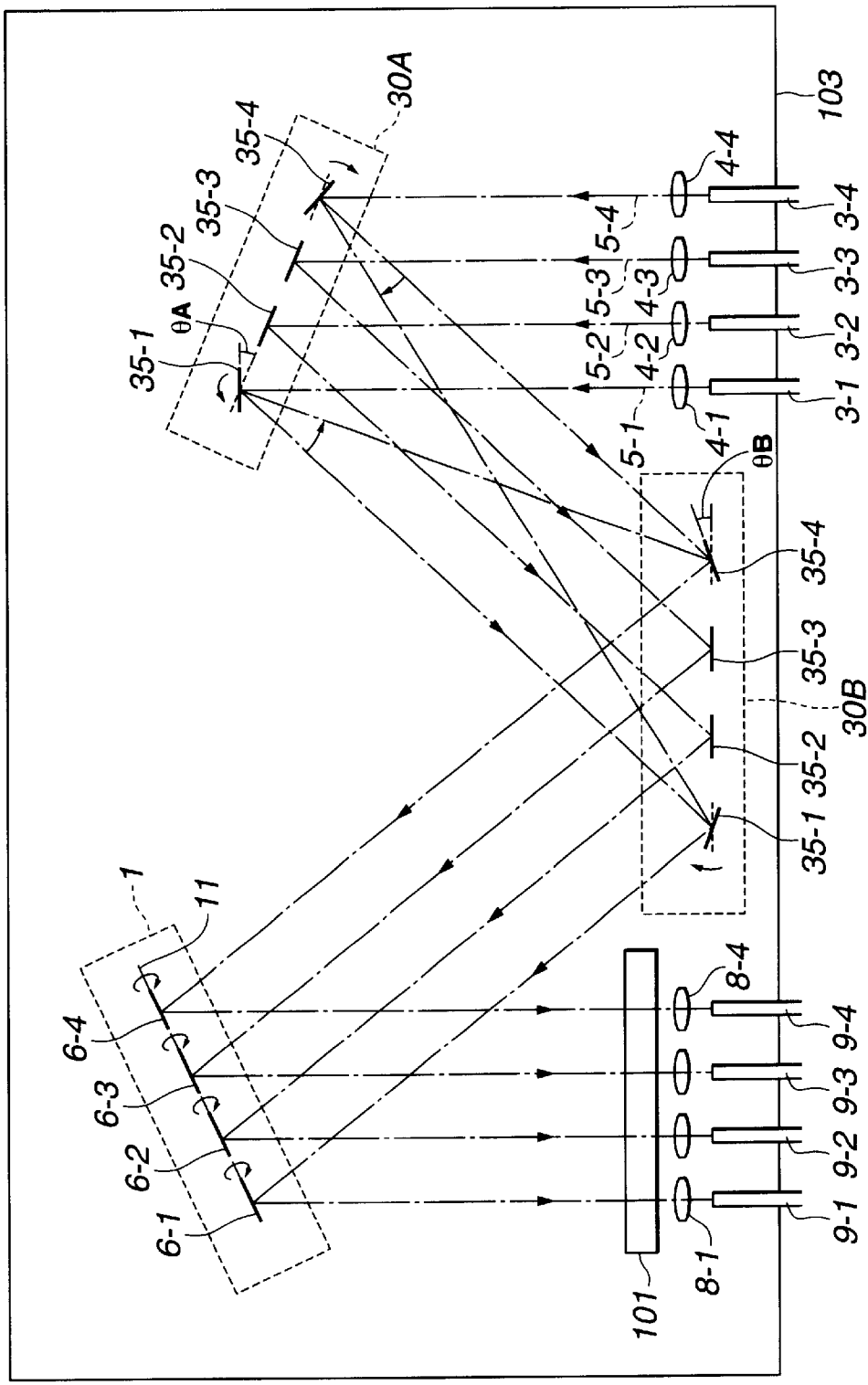

Furthermore, FIG. 14 shows a case in which the mirror angles are such that a light 5-4 of an optical fiber 3-4 is switched to an optical fiber 9-1 and outputted.

Furthermore, in this embodiment, four optical fibers were arranged for input-output, but the number of fibers can be a number other than four as well. For example, there can be one input fiber and two output fibers. In this case, one mirror 35 can be arranged in a galvo unit 30A, two mirrors 35-1, 35-2 can be arranged in a galvo unit 30B, and two mirrors 6-1, 6-2 can be arranged in a galvo unit 1. Further, the number of respective mirrors corresponding to the number of input-output optical fibers can also be arranged according to circumstances.

Figure 16:
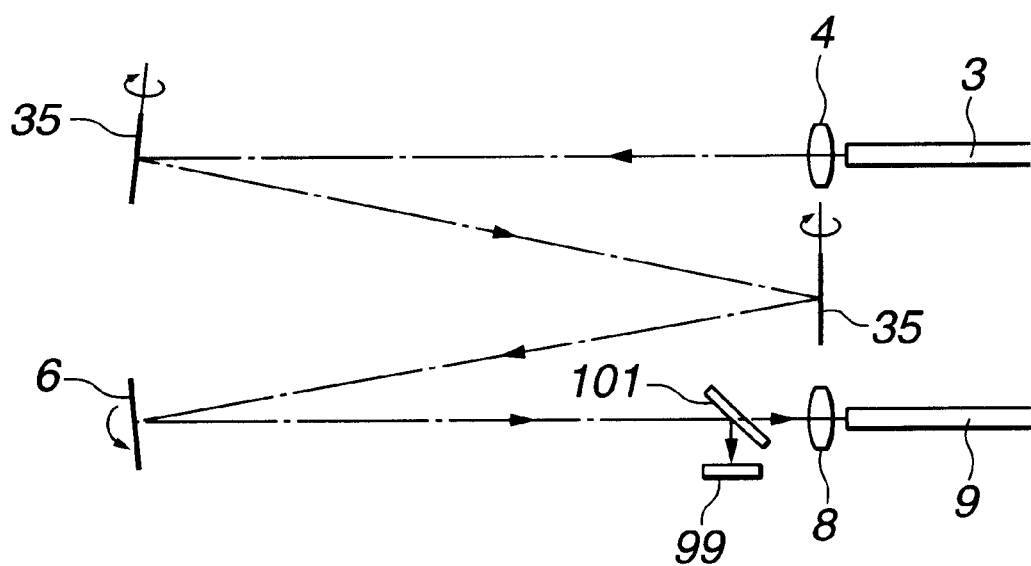

FIG. 15 and FIG. 16 show examples of the constitution of another optical path switching device. FIG. 15 shows a perspective view of a schematic constitution thereof, and FIG. 16 shows the constitution as seen from the side. Furthermore, in FIG. 16, only one of the four optical fibers 3-1 through 3-4 is shown. In this variation, the optical paths from the optical fibers for inputting to the optical fibers for outputting are arranged perpendicular to the direction in which the optical fibers for inputting are arrayed. In this case, as shown in FIG. 15, there is an effect, which enables the width W of the optical switch box 103 to be made narrower.

This embodiment is an optical path switching apparatus shown in FIG. 15 and FIG. 16, and more specific examples of the constitution will be given.

The optical path switching apparatus for optical communications is constituted comprising galvo units 30A and 30B, which move mirrors 35, respectively; a galvo unit 1, which moves a mirror 6; and two coupling devices 104A and 104B for coupling an optical fiber 3 and a spherical lens 4, and an optical fiber 9 and a spherical lens 8.

Figure 19A:
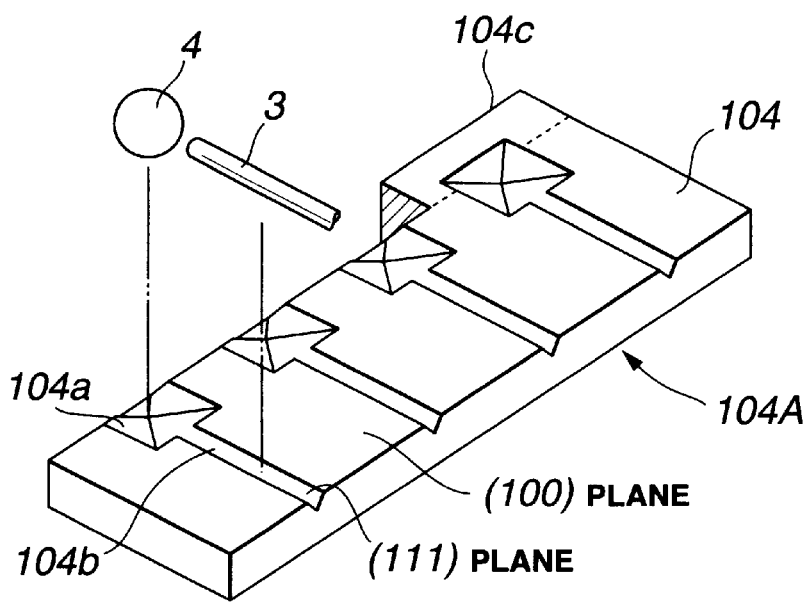
Figure 19B:
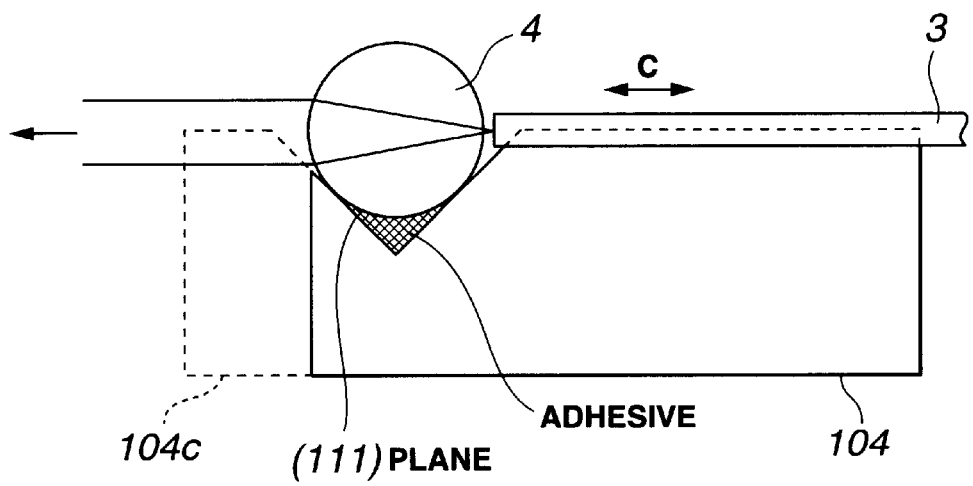

For example, coupling device 104A has a constitution such as that shown in FIG. 19A and FIG. 19B. FIG. 19A shows a perspective view of the coupling device 104A, and FIG. 19B shows a cross-sectional view.

Anisotropic etching of a thin silicon wafer 104 is performed along the (111) plane on the (100) plane single-crystal Si substrate forming a plurality (FIG. 19A, for example, illustrates a case in which there are four) of evenly-spaced square pyramid-shaped concave portions 104a and V-grooves 104b linking to the respective concave portions 104a. Following etching, cutting is performed using a dicing saw at a position approximately ⅔ from the center of the intersection point of the right inclined face with the left inclined face on the (111) plane in the figure, which is the end portion 104c of the respective square pyramid-shaped concave portions 104a. In other words, the part indicated by a dotted line in FIG. 19A is cut and the end portion 104c side is discarded, preventing a shading for an optical path.

Then, a spherical-shaped lens (described as a spherical lens as hereinabove) 4 is used, and this spherical lens 4 is affixed with adhesive to a square pyramidal concave portion 104a as shown in FIG. 19B. Instead of cutting off an end portion 104c, a V-groove that is deeper than a V-groove 104b can be formed, so that an optical path through lens 4 is maintained.

An optical fiber 3 has a core diameter of eight microns, and a cladding diameter of 125 microns, and is positioned in the V-groove 104b. And then, the position of the optical fiber 3 is adjusted in the C direction shown in the figure, the degree of parallelism of the light emitted from the spherical lens 4 is adjusted, the optical fiber 3 is affixed using an adhesive, and a coupling device 104A is formed. Furthermore, a coupling device 104B also has the same constitution.

Figure 17:
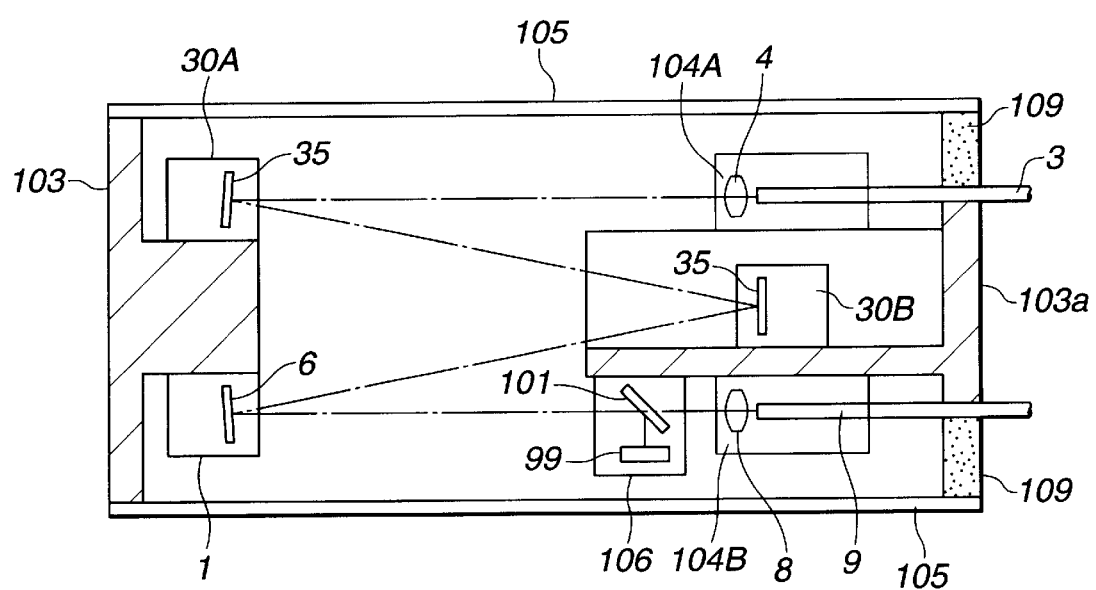
Figure 18:
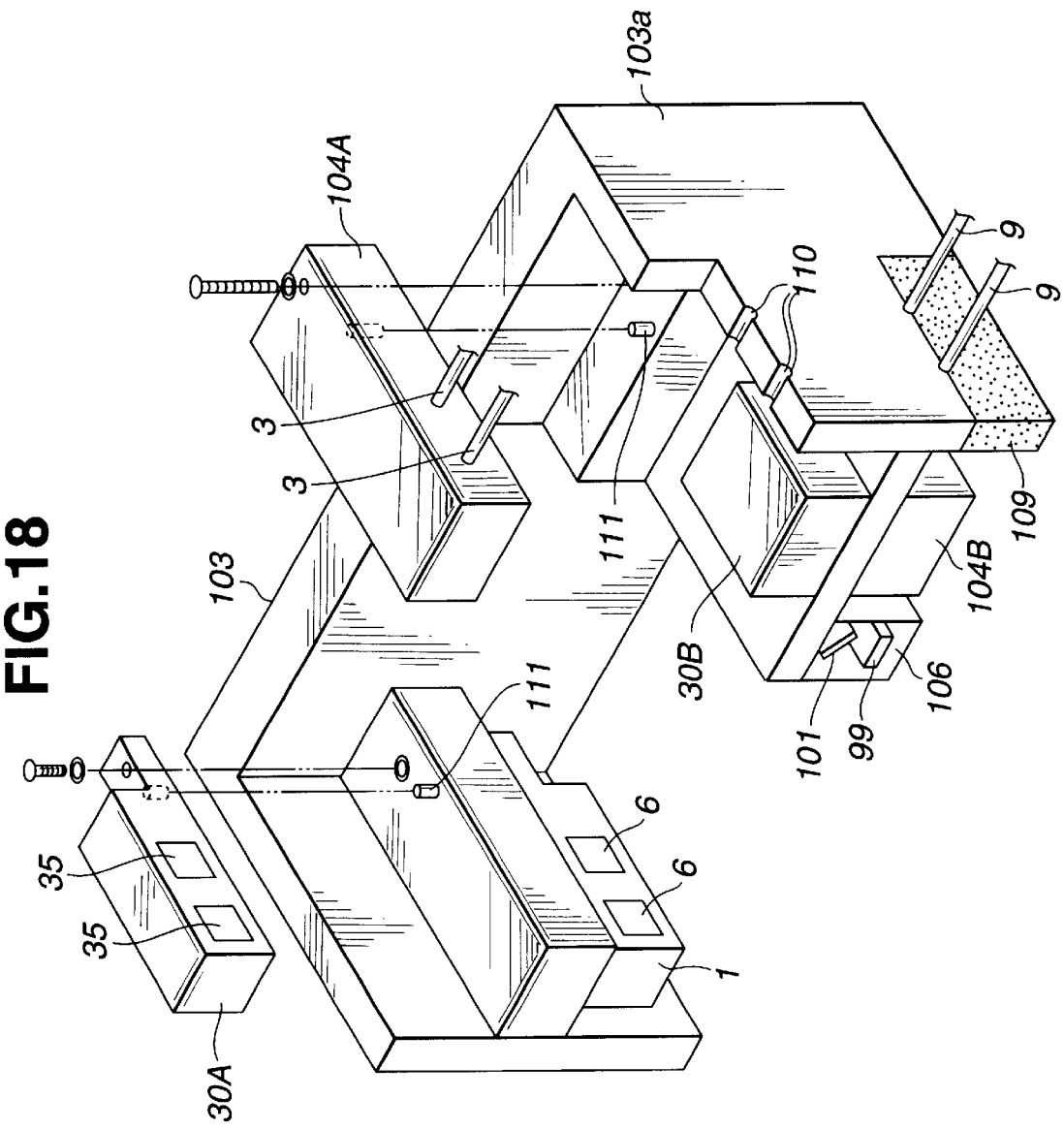

Further, as shown in FIG. 17 and FIG. 18, a sensor holder 106, in which is integrated a half mirror 101, constituting a multi-layered dielectric film on the surface of a sheet-like parallel flat plate, and a photodetector (PSD) 99 for monitoring the quantity of emitted light of a light beam, is arranged in front of the coupling device 104B. In addition, two housings 12 shown in FIG. 3 for the first embodiment are used.

In the optical path switching device of this embodiment, a plurality of optical fibers 3, a plurality of optical fibers 9 and a galvo unit 30B constitute a three-tiered structure, and a galvo unit 30A and a galvo unit 1 constitute a two-tiered structure.

Further, to hold either optical fibers 3 that extend from the coupling device 104A, or optical fibers 9 that extend from the coupling device 104B via an optical switch box 103, a plurality of V-grooves 110 (See FIG. 18) for affixing either the respective optical fibers 3 or optical fibers 9 are formed in a right-side wall portion 103a, and either optical fibers 3 or 9 are affixed with adhesive in the respective V-grooves 110. The plurality of optical fibers 3 and 9, respectively, are protected by a packing 109 comprising a rubber material.

As shown in FIG. 17, the top surface and bottom surface of optical switch box 103 are covered, respectively, by covers 105.

Further, as shown in FIG. 18, positioning pins 111 are arranged in a standing condition on unit mounting surfaces inside the optical switch box 103, respective pin holes are provided in the galvo unit 30A and the coupling device 104A, the galvo unit 30A and the coupling device 104A are positioned by inserting the positioning pins 111 into the respective pin holes, and are affixed using screws and washers.

This device has the following effects.

Light irradiated from the tip of optical fiber 3 is formed into a substantially collimated beam by the spherical lens 4, and reflected by a mirror 35 of the galvo unit 30A, which is arranged in an opposing position, and the reflected light thereof is reflected by the mirror 35 of the galvo unit 30B, which is arranged beneath the coupling device 104A. The reflected light thereof is reflected by a mirror 6 of the galvo unit 1, which is arranged below the galvo unit 30A, and irradiated onto a sensor holder 106, which is arranged below the galvo unit 30B.

The light incident upon this sensor holder 106 is split into two beams by the half mirror 101, one side is transmitted, converged by a spherical lens 8 and irradiated onto an optical fiber 9, passes through the inside of this optical fiber 9, and is sent to the outside. Further, the light reflected by the half mirror 101 is monitored by the PSD 99.

According to this embodiment, there is an effect that makes it possible to constitute a compact optical path switching apparatus.

Having described the preferred embodiments of the invention referring to the accompanying drawings, it should be understood that the present invention is not limited to those precise embodiments, and various changes and modifications thereof could be made by one skilled in the art without departing from the spirit or scope of the invention as defined in the appended claims.

What is claimed is:

1. An optical element drive device comprising:
   a plurality of movable members to which a plurality of optical elements having functions for changing a path of light are attached, respectively;
   a plurality of support mechanisms for independently supporting said plurality of movable members in a displaceable condition;
   a plurality of drive mechanisms for driving said plurality of movable members; and
   a fixed member to which said plurality of movable members are mounted, wherein said plurality of drive mechanisms comprise coils and magnets, and at least one component of said plurality of drive mechanisms is used to drive at least two of said plurality of movable members.

2. The optical element drive device according to claim 1, wherein said at least one component is a magnet and is used to drive all of said movable members.

3. The optical element drive device according claim 1, wherein said optical elements comprise mirrors for reflecting light.

4. The optical element drive device according to claim 1, wherein said plurality of support mechanisms support said plurality of movable members, respectively, in a rotatable condition around a common axis.

5. The optical element drive device according to claim 1, wherein the coils of said plurality of drive mechanisms are attached to said plurality of movable members, respectively, and at least one of said magnets is used in common.

6. The optical element drive device according to claim 5, wherein the coils of said plurality of drive mechanisms are attached to said plurality of movable members, respectively, and are arranged at a predetermined pitch in a longitudinal direction, facing said magnets.

7. The optical element drive device according to claim 6, wherein a magnetic force is caused to act between said magnets, which face said coils, by applying a drive signal to said coils, so that the movable members to which said coils are attached are rotatably displaced at an arbitrary angle around an axis, which is rotatably supported by said support mechanisms.

8. The optical element drive device according to claim 1, wherein said plurality of support members comprise rotatably displacable spring members.

9. The optical element drive device according to claim 8, wherein said spring members have an approximate S shape.

10. The optical element drive device according to claim 8, wherein said spring members are coupled to said coils of said plurality of drive mechanisms.

11. The optical element drive device according to claim 1, further having sensors for detecting a quantity of displacement of said optical elements provided in said plurality of movable members.

12. The optical element drive device according to claim 1, wherein said magnets extend along a direction in which said plurality of drive mechanisms are arrayed.

13. The optical element drive device according to claim 1, wherein said plurality of movable members are respectively arrayed between adjacent ones of said magnets which are used to respectively drive said plurality of movable members.

14. The optical element drive device according to claim 1, wherein some of said plurality of drive mechanisms extend in a direction in which said magnets and coils are arrayed.

15. The optical element drive device according to claim 1, wherein respective components of said plurality of drive mechanisms are arranged on an opposite side of said movable members with respect to said optical elements.

16. The optical element drive device according to claim 1, wherein respective components of said plurality of drive mechanisms are arranged between adjacent ones of said movable members.

17. The optical element drive device according to claim 1, wherein said magnets are multi-polar magnets.

18. The optical element drive device according to claim 1, wherein said plurality of optical elements are integrally molded.

19. The optical element drive device according to claim 1, wherein said plurality of support mechanism are integrally molded with said plurality of movable members.

20. The optical element drive device according to claim 1, wherein there is formed an optical path switching switch for switching a plurality of optical fibers for outgoing light by reflecting light emitted from a plurality of optical fibers for incident light by the optical elements, and for changing an angle of the reflected light.

21. An optical path switching switch comprising a plurality of said optical element drive devices of claim 1.

22. An optical element drive device comprising:
   a plurality of movable portions to -which a plurality of optical elements having functions for changing a path of light are attached, respectively;
   a plurality of support members for supporting said plurality of movable portions in a rotatable condition;
   a common fixed member having a plurality of storage portions for respectively storing respective ones of said movable portions supported respectively by said support members; and
   a plurality of drive mechanisms for magnetically driving said respective plurality of movable portions independently.

23. The optical element drive device according to claim 22, wherein said optical elements comprise mirrors for reflecting light.

24. The optical element drive device according to claim 22, wherein said plurality of support members respectively support said plurality of movable portions in a rotatable condition around an axis, which is parallel to a predetermined direction.

25. The optical element drive device according to claim 22, wherein said plurality of drive mechanisms comprise coils which are attached respectively to each movable portion, and magnets, which are arranged between adjacent ones of said coils, respectively.

26. The optical element drive device according to claim 22, wherein said plurality of storage portions are formed in a line at predetermined intervals, and magnets are arranged between adjacent ones of said storage portions, respectively.

27. The optical element drive device according to claim 22, wherein said movable portions of a same constitution are supported in a rotatable condition by said support members, and are respectively stored in said plurality of storage portions.

28. The optical element drive device according to claim 22, further comprising sensors for detecting a quantity of displacement of said optical elements disposed in said plurality of movable portions, respectively.

29. An optical element drive device comprising:
- a plurality of movable members respectively provided with optical elements having functions for changing a path of light;
- a plurality of support members for respectively supporting said plurality of movable members independently in a displacable condition; and
- a plurality of magnetic drive mechanisms for driving said plurality of movable members,
- wherein said plurality of magnetic drive mechanisms comprise coils and magnets, and at least one component of said plurality of magnetic drive mechanisms is used to drive at least two of said plurality of movable members.

30. The optical element drive device according to claim 29, wherein said optical elements comprise mirrors for reflecting light.

31. The optical element drive device according to claim 29, wherein said plurality of movable members and said plurality of support members are formed in common by processing a substantially sheet shaped member.

32. The optical element drive device according to claim 31, wherein said process comprises an etching process.

33. The optical element drive device according to claim 31, wherein said plurality of movable members are formed at a predetermined pitch along a line along which said movable members are supported by the respective support members.

34. The optical element drive device according to claim 31, wherein said magnetic drive mechanisms comprise coils formed respectively on said plurality of movable members.

35. The optical element drive device according to claim 34, wherein said magnetic drive mechanisms comprise a substantially plate shaped member formed by magnetization in a plurality of locations, facing the movable members formed by processing said substantially sheet shaped member.

* * * * *